(12) United States Patent
Lu

(10) Patent No.: US 7,647,148 B2
(45) Date of Patent: Jan. 12, 2010

(54) ROLL STABILITY CONTROL SYSTEM FOR AN AUTOMOTIVE VEHICLE USING COORDINATED CONTROL OF ANTI-ROLL BAR AND BRAKES

(75) Inventor: Jianbo Lu, Livonia, MI (US)

(73) Assignee: Ford Global Technologies, LLC, Deerborn, MI (US)

( * ) Notice: Subject to any disclaimer, the term of this patent is extended or adjusted under 35 U.S.C. 154(b) by 1127 days.

(21) Appl. No.: 10/735,133

(22) Filed: Dec. 12, 2003

(65) Prior Publication Data

US 2005/0131604 A1 Jun. 16, 2005

(51) Int. Cl.
G06F 7/00 (2006.01)

(52) U.S. Cl. .......................................... 701/38

(58) Field of Classification Search ............. 701/36–38, 701/69–71; 180/197, 271, 282; 340/425.5, 340/438, 440; 280/5.5, 5.502, 5.506, 5.507; 303/121, 1
See application file for complete search history.

(56) References Cited

U.S. PATENT DOCUMENTS

| | | | | |
|---|---|---|---|---|
| 4,886,291 A | * | 12/1989 | Okamoto | ................. 280/5.501 |
| 5,217,248 A | * | 6/1993 | Reast | .......................... 280/684 |
| 6,263,261 B1 | * | 7/2001 | Brown et al. | .................... 701/1 |
| 6,654,674 B2 | | 11/2003 | Lu et al. | |
| 6,741,922 B2 | * | 5/2004 | Holler | .......................... 701/71 |
| 6,856,868 B1 | * | 2/2005 | Le et al. | ........................ 701/38 |
| 2004/0167701 A1 | * | 8/2004 | Mattson et al. | ............... 701/71 |

OTHER PUBLICATIONS

U.S. Appl. No. 10/628,685, Salib.
U.S. Appl. No. 10/628,632, Salib.
U.S. Appl. No. 10/628,484, Salib.
U.S. Appl. No. 10/175,579, Lu.
U.S. Appl. No. 10/174,736, Lu.
U.S. Appl. No. 10/140,240, Lu.
U.S. Appl. No. 10/610,280, Lu.
U.S. Appl. No. 10/610,279, Lu.
U.S. Appl. No. 10/610,278, Lu.
U.S. Appl. No. 10/619,051, Lu.
U.S. Appl. No. 10/605,772, Chou.
U.S. Appl. No. 10/619,007, Lu.

* cited by examiner

*Primary Examiner*—Yonel Beaulieu
(74) *Attorney, Agent, or Firm*—Angela M. Brunetti; Fredrick Owens (57) ABSTRACT

A roll stability control system (18) for an automotive vehicle (10) includes an active anti-roll bar system (62) and a rollover sensor (40) that generates a roll attitude signal indicative of a pending rollover of the vehicle. A controller (26) controls the active anti-roll bar system (62) to prevent the vehicle from rolling over in response to the roll attitude signal. The controller (26) may also control a brake system (60). The brake system may be used in addition to the active anti-roll bar system to prevent rollover of the vehicle.

21 Claims, 5 Drawing Sheets

ROLL STABILITY CONTROL SYSTEM FOR AN AUTOMOTIVE VEHICLE USING COORDINATED CONTROL OF ANTI-ROLL BAR AND BRAKES

TECHNICAL FIELD

The present invention relates generally to a dynamic behavior control apparatus for an automotive vehicle, and more specifically, to a method and apparatus for controlling the roll characteristics of the vehicle by coordinating the control of an active anti-roll bar system and an active brake system.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

Vehicle roll characteristics have four different regions based on the magnitude of roll and the roll rate changes. In the small magnitude roll region, which may be called vibration roll region, the vehicle body roll angle with respect to the average road surface is mainly induced by moving on the uneven road surface. For example, the rough surface of the road generates high frequency roll vibration; the potholes or big bumps in the road also induce vehicle vibration roll motion.

In the medium magnitude region, which should be called a handling roll region, the body roll motion with respect to the average surface is mainly induced by the handling maneuver of the vehicle. For example, during hard cornering, the vehicle will generate a relatively large roll motion due to the large lateral acceleration of the vehicle. Noticeably one wheel lifting may happen in this region.

The third roll region, which may be called a safety roll region, is where the relative roll motion of the vehicle exceeds the pre-determined limit and the vehicle starts to roll over if there is no proper counteracting effort applied to the vehicle. In this region, the two wheels at one side of the vehicle may be lifting or diverging from contacting the road. This roll motion is mainly due to the large lateral forces applied at the tires from the road and the large magnitude of the lateral acceleration of the vehicle.

The fourth roll region, which should be called the uncontrollable roll region, is where the rollover of the vehicle is inevitable and the passive safety device such as side airbags are activated.

Vibration roll falls within the working region of the semi-active or active suspensions. Since its lack of control authority, semi-active can never be used to achieve roll attenuation beyond vibration roll region. Although active suspension might be used to take care of both vibration roll and handling roll, the power consumption requirement limits its potential for attenuating a large handling roll, and the suspension dynamics may also limit its fast response to a sudden and big handling roll. In order to achieve roll stiffness adjustment, the active suspension needs to control the vertical stiffness and damping at each corner of the vehicle, which most likely will induce the stiffness changes other than roll stiffness, for example, the heave and pitch stiffness of the vehicle. Hence the active suspensions meet the vehicle performance requirement for achieving vibration roll attenuation.

The handling roll control is also called tilt control (or body roll control), which is required to activate on demand. That is, it only activates when the vehicle is in handling maneuver and it must be turned off as the vehicle comes out of the maneuver, for example, when the vehicle leaves a turn and starts to move straight. If the handling roll is not turned off on straight road driving, the uneven road may cause harsh roll motion since road induced vibration roll is not isolated. The handling roll control must not induce suspension stiffness changes in directions other than the roll direction, for example, heave and pitch stiffness especially when the handling is on an uneven road surface. Since active suspension needs to increase the vertical stiffness at the corners (increasing heave and pitch stiffness) so as to increase roll stiffness, it does not meet this requirement.

The safety roll control needs significant control forces to reduce the tire lateral forces and the lateral acceleration of the vehicle such that potential rollover could be prevented. The brake controls used in roll stability control achieve such on-road rollover prevention. However due to response time limitation in the hydraulic braking system, during initial stage of a rollover event there may not be enough braking pressure available.

It would therefore be desirable to provide a roll stability system that fully utilizes the combined but coordinate control of the active anti-roll bar and active brakes to achieve on-road rollover prevention.

SUMMARY OF THE INVENTION

Since the electronically controlled anti-roll bar has very fast response time, it can be used to reduce the roll motion during the initial rollover and help delay the severe rollovers. On the other hand, in certain maneuvers especially when the vehicle develops large side slip angle, the anti-roll bar alone may achieve enough tire lateral force reduction to prevent rollover without slowing down the vehicle. Therefore a combined and coordinated control of active-anti-roll bar and active brake system could achieve better rollover prevention performance.

In one aspect of the invention, the roll stability control system for an automotive vehicle includes a plurality of sensors sensing the dynamic conditions of the vehicle. A controller is coupled to the sensors to determine a roll angle estimate. The controller controls a roll stiffness using active anti-roll bar and brake forces using active brakes to reduce a tire moment so the net moment of the vehicle is counter to the roll direction. The sensors may include but are not limited to a speed sensor, a lateral acceleration sensor, a longitudinal acceleration sensor, a roll rate sensor, and a yaw rate sensor.

In a further aspect of the invention, a method of controlling roll stability of the vehicle comprises the steps of determining a roll angle estimate in response to a rollover sensor, and controlling an active anti-roll bar actuator and brake actuators in response to the roll angle estimate.

One advantage of the invention is that such systems help increase the effective control of anti-roll bar for handling control, since the desired roll information is available for actuation. Another advantage is that the coordinated control system increases the control authority for controlling severe rollovers, increases the stability boundary for the roll angle, and increases the response time of actuation. A further advantage is that the coordinated system provides less intrusive actuation for achieving rollover control. Another further advantage is that during an open-throttle maneuver activating anti-roll bar first and brakes later reduces uneasy feelings of the driver caused by slowing down the vehicle.

Other objects and features of the present invention will become apparent when viewed in light of the detailed description of the preferred embodiment when taken in conjunction with the attached drawings and appended claims.

DETAILED DESCRIPTION

In the following figures the same reference numerals will be used to identify the same components.

The present invention may be used in conjunction with a rollover control system for a vehicle. However, the present invention may also be used with a deployment device such as an airbag. The present invention will be discussed below in terms of preferred embodiments relating to an automotive vehicle moving in a three-dimensional road terrain.

Figure 1:
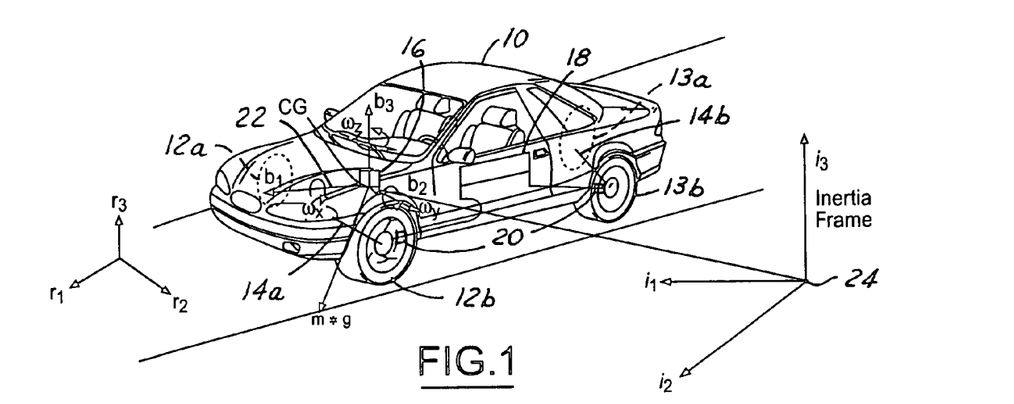
FIG. 1 is a diagrammatic view of a vehicle with variable vectors and coordinated frames according to the present invention.

Referring to FIG. 1, an automotive vehicle 10 with a safety system of the present invention is illustrated with the various forces and moments thereon during a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s$^2$ and M is the total mass of the vehicle.

The sensing system 16 may use a standard yaw stability control sensor set (including lateral accelerometer, yaw rate sensor, steering angle sensor and wheel speed sensor) together with a roll rate sensor and a longitudinal accelerometer. The various sensors will be further described below. The wheel speed sensors 20 are mounted at each corner of the vehicle, and the rest of the sensors of sensing system 16 are preferably mounted directly on the center of gravity of the vehicle body, along the directions x, y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate, and $\omega_z$ for the yaw rate. The present invention calculations preferably take place in an inertial frame 24 that may be derived from the body frame 22 as described below.

The angular rate sensors and the accelerometers are mounted on the vehicle car body along the body frame directions $b_1$, $b_2$ and $b_3$, which are the x-y-z axes of the vehicle's sprung mass.

The longitudinal acceleration sensor is mounted on the car body located at the center of gravity, with its sensing direction along $b_1$-axis, whose output is denoted as $a_x$. The lateral acceleration sensor is mounted on the car body located at the center of gravity, with its sensing direction along $b_2$-axis, whose output is denoted as $a_y$.

The other frame used in the following discussion includes the road frame, as depicted in FIG. 1. The road frame system $r_1 r_2 r_3$ is fixed on the driven road surface, where the $r_3$ axis is along the average road normal direction computed from the normal directions of the four tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$ and $\theta_{zbr}$, which are also called the relative Euler angles.

Figure 2:
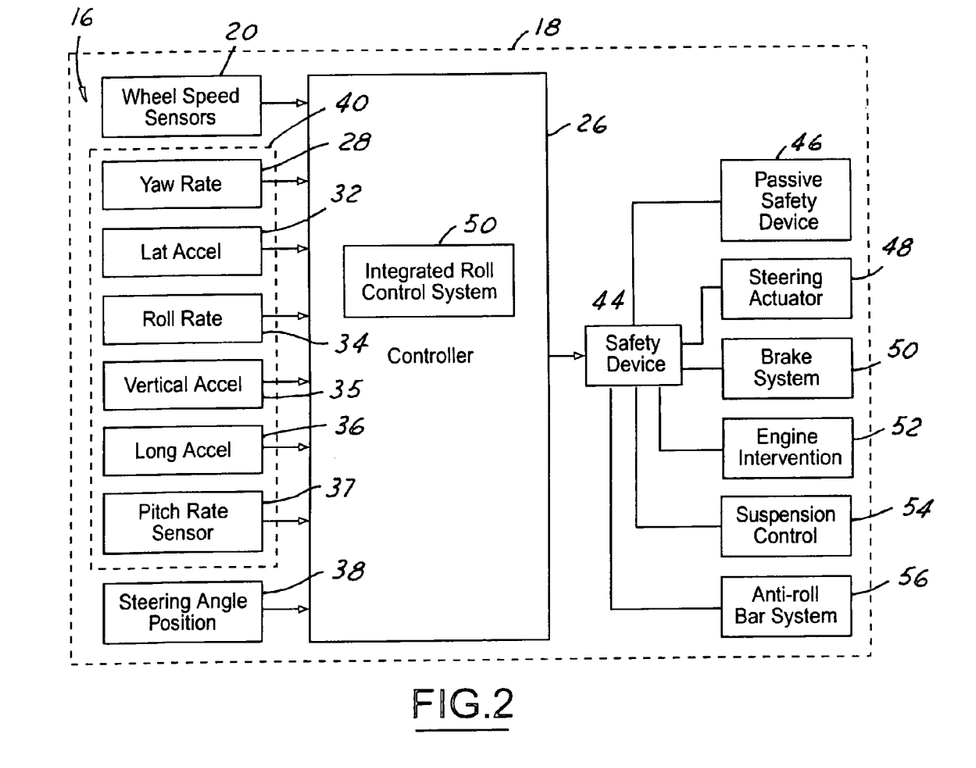
FIG. 2 is a block diagram of a stability system according to the present invention.

Referring now to FIG. 2, roll stability control system 18 is illustrated in further detail having a controller 26 used for receiving information from a number of sensors which may include speed sensors 20, a yaw rate sensor 28, a lateral acceleration sensor 32, a roll rate sensor 34, a vertical acceleration sensor 35, a longitudinal acceleration sensor 36, a pitch rate sensor 37, and steering angle position sensor 38. Sensors 28-38 may be part of an integrated measurement unit 40 or IMU.

In one embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 44. Depending on the desired sensitivity of the system and various other factors, not all the sensors 28-38 may be used in a commercial embodiment. Safety device 44 is part of a vehicle subsystem control. Safety device 44 may control a passive safety device 46 such as an airbag or a steering actuator 48, a braking actuator 50 at one or more of the wheels 12a, 12b, 13a, 13b of the vehicle. Engine intervention 52 may act to reduce engine power to provide a safety function. Also, other vehicle components such as a suspension control 54 may be used to adjust the suspension to prevent rollover.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Steering control 48 may control the position of the front right wheel actuator, the front left wheel actuator, the rear left wheel actuator, and the right rear wheel actuator. Although as described above, two or more of the actuators may be simultaneously controlled. For example, in a rack-and-pinion system, the two wheels coupled thereto are simultaneously controlled. Based on the inputs from sensors 28 through 38, controller 26 determines a roll condition and controls the steering position of the wheels.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Controller 26 may include an integrated roll control system 58. While these functions are provided by controller 26, several controllers may be used to provide various determinations and control functions. The controller 26 may be programmed to provide the various functions.

Figure 3:
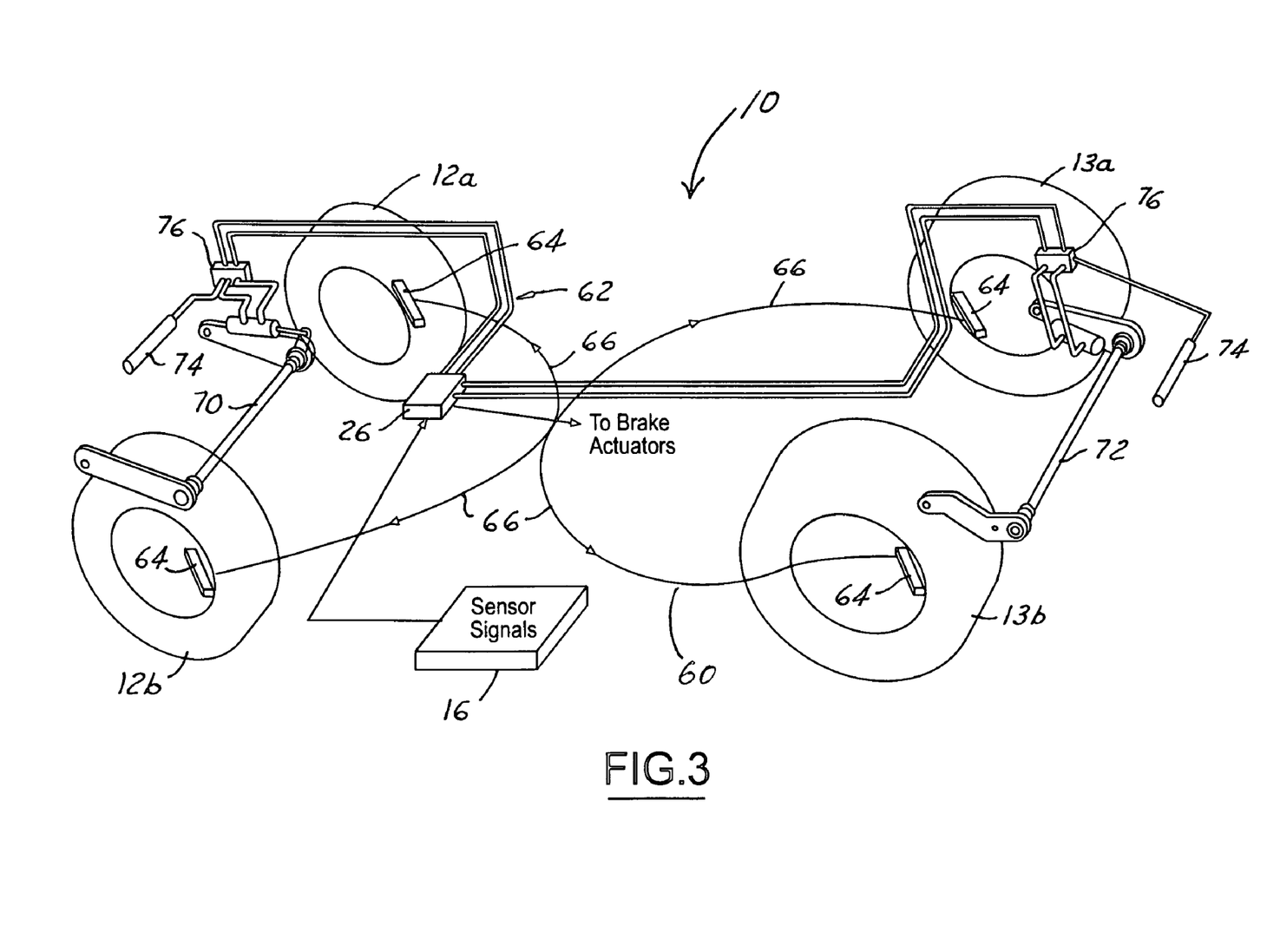
FIG. 3 is a simplified perspective view of the anti-roll bar system and brake system of the automotive vehicle.

Referring now to FIG. 3, automotive vehicle 10 is partially illustrated having brake system 60 and anti-roll bar system 62. Brake system 60 and anti-roll bar system 62 may be controlled by controller 26. Although, as those skilled in the art will recognize, a separate controller 26 may be used for the brake system 60 and the anti-roll bar system 62. The brake system 62 includes a plurality of independently controllable brakes 64. The brakes may be hydraulic or electrically actuated through brake lines 66. Active anti-roll bar system 62 includes a front active anti-roll bar 70 and a rear active anti-roll bar 72. Both the front and rear active anti-roll bar 70, 72 may be hydraulically or electrically actuated. As illustrated, a hydraulic system is depicted. Active anti-roll bar 70 and 72 may be independently actuated to provide the desired control as will be further described below. Each active anti-roll bar 70, 72 includes a reservoir 74 and a valve block 76. Controller 26 controls valve block 76 so that fluid may be provided to the active anti-roll bars 70, 72 to change the characteristics thereof.

Figure 4:
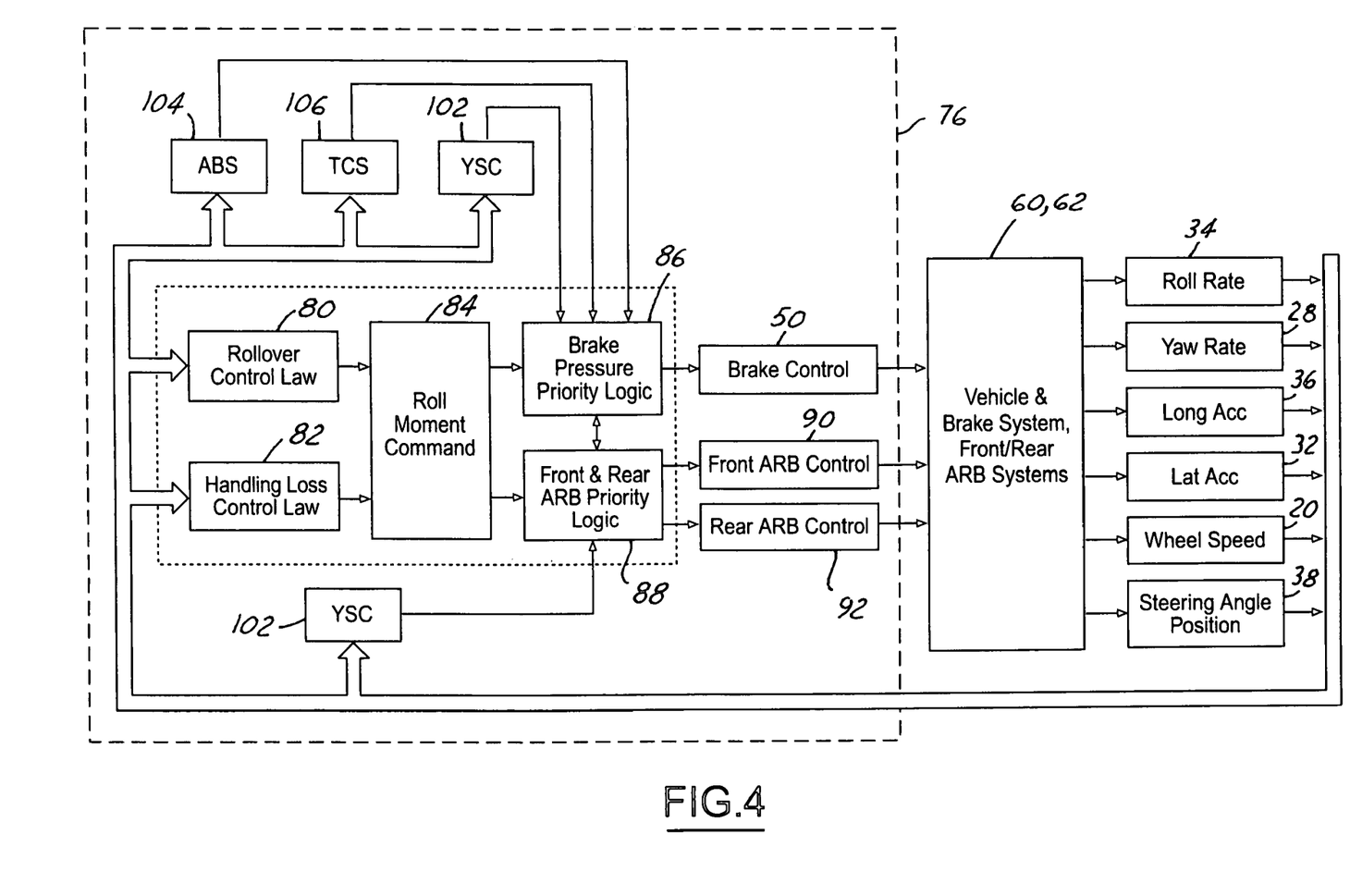
FIG. 4 is a block diagrammatic view of the controller of the present invention.

Referring now to FIG. 4, controller 26, and in particular the integrated roll control system 58, is illustrated in further detail. The integrated roll control system 58 includes rollover control law 80 and handling roll control law 82. The rollover control law 80 and handling roll control law 82 are coupled to a roll moment command 84. The output of the roll moment command is used to control the brake pressure priority logic 86 and a front and rear anti-roll bar (ARB) priority logic 88. The brake pressure priority logic 86 and the front and rear arbitration priority logic 88 receive the roll angle from the roll moment command 84 and controls brake control 50 and anti-roll bar system 56, which may consist of the front anti-roll bar control 90 and the rear anti-roll bar control 92. The brake control 50, front anti-roll bar control 90, and the rear anti-roll bar control 92 control the brake system 60/anti-roll bar system 62. The control provided by the brake control 50 and the anti-roll bar control 56 are fed back to the system through roll rate sensor 34, longitudinal acceleration sensor 36, lateral acceleration sensor 32, wheel speed sensors 20, and steering angle position sensor 38. The information from these systems is fed back to the yaw stability controller 102, an anti-lock brake system 104, and a traction control system 106. The anti-lock brake system 104 generates a brake control signal. The traction control system 106 generates a brake traction control signal. The yaw stability controller 102 generates a brake control signal. The yaw stability controller 102 may also provide an input with respect to the yawing of the vehicle to the front and rear arbitration priority logic 88 and the brake pressure priority logic 86. The brake pressure logic receives the brake control signals and generates brake controls to prevent the vehicle from rolling over. The anti-roll bars may also be controlled and coordinated with the brake control to prevent the vehicle from rolling over. As will be described below, the anti-roll bar system may be used to simultaneously control rollover while the brake system may be used to control yawing or vice-versa after both systems are used for rollover control. The anti-roll bars may also be controlled sequentially with the brakes to prevent rollover.

Figure 5:
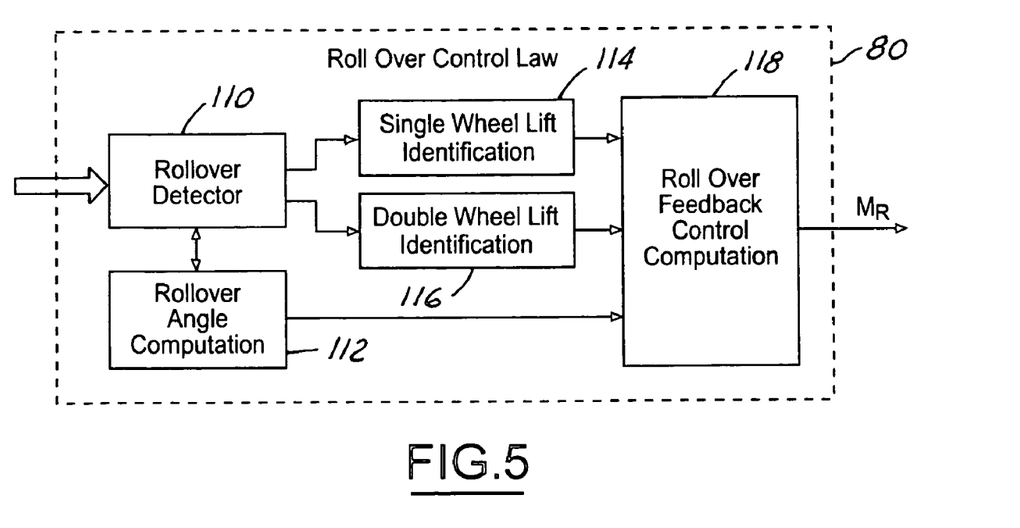
FIG. 5 is a block diagrammatic view of the rollover control law of FIG. 4.

Referring now to FIG. 5, rollover control law 80 is illustrated in further detail. Rollover control law 80 may comprise a rollover detector 110 that is coupled to the various sensors. Further, a roll angle computation 112 may also be performed by rollover control law 80. The rollover detector detects the presence of rollover and determines a roll angle of the vehicle. Rollover detector may, for example, provide a single wheel lift identification 114 or a double wheel lift identification 116. The output of the single wheel lift identification 114, double wheel lift identification 116, and roll angle computation 112 are provided to a rollover feedback control computation 118. The rollover feedback control computation generates a moment $M_R$ that is the roll moment of the vehicle. Thus, by knowing the roll moment of the vehicle the roll moment can be counteracted as will be further described below.

Figure 6:
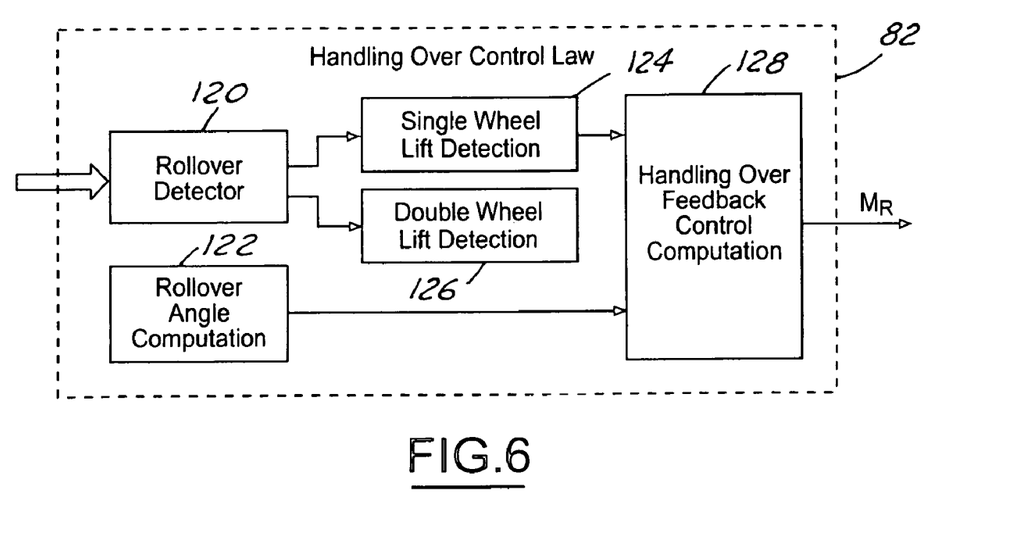
FIG. 6 is a block diagrammatic view of the handling loss control law of FIG. 4.

Referring now to FIG. 6, handling roll control law 82 may also consist of a rollover detector 120 and a roll angle computation 122. The roll detector in a similar manner to the rollover control law 80 may provide an indication of single wheel lift detection 124, or double wheel lift detection 126. Single wheel lift detection 124, double wheel lift detection 126, and roll angle computation 122 may be provided to a handling roll feedback control computation 128 that generates a roll moment $M_R$ of the vehicle. By knowing the roll angle of the vehicle, the roll moment may be counteracted.

In operation, the system increases the authority of the rollover prevention over the brake-based rollover prevention since the anti-roll bar system reduces the roll magnitude and both the front and rear tire lateral forces can be significantly reduced. The real time adaptation rule for determining which actuator/actuators are to be activated allows a less intrusive system: in one embodiment, in low speed or low lateral acceleration induced rollover (low energy rollover) the anti-roll bar control system is commanded; while in medium energy rollover the brake control is activated, and in extreme excessive maneuvers (high energy rollover) both the brake control and the anti-roll bar control may be activated. On the other hand using two types of actuators also allows sequential control to achieve more functionality during a rollover control incident. For example, in extreme maneuver case, both actuators are activated in the very beginning of the rollover, then the use of one of the actuators may be shifted for a non-rollover prevention function (for example, yaw stability control) while the other is still in rollover prevention mode. In this way, more safety features can be achieved since if the primary rollover prevention causes vehicle instability in non-rollover direction (spin-out, i.e., yaw instability), "hard" rollover may happen due to the possibility of tires hitting the road edge or other hard bumps. When tires hit the hard bumps in the road from the lateral direction, the vehicle will most likely be in the uncontrollable roll region.

Furthermore, the coordinated control of the two actuators helps increase the response time over a brake-based roll stability control system. Due to the limitation in the hydraulic braking system, during initial stage of a rollover event there may not be enough braking pressure available. Since the electronically controlled anti-roll bar has very fast response time it can be used to reduce the roll motion during the initial rollover and help delay the severe rollovers. On the other hand, if further development does induce a severe rollover, the braking pressure may be already built up.

In summary, the integrated control provides a number of benefits.

One benefit is providing improvement for rollover control with adjustable authority. Hence during a low energy roll instability, less intrusive control may be applied (for example, using an active anti-roll bar), while at high energy roll instability aggressive control will be applied (for example, using braking or braking/active anti-roll bar together).

Another benefit is providing high speed rollover prevention without slowing down the vehicle (if active anti-roll bar is used instead of braking), which is very useful in race car and vehicle passing during a double lane change maneuver.

Yet another benefit is reducing ride comfort deterioration during active control. For example, the active anti-roll bar can be used for achieving handling roll control during a yaw stability control.

A further benefit is reducing the false actuation in handling roll control using active anti-roll bar system. Since the roll stability control system has the mechanism to detect the vehicle roll angle a banked road will be identified such that active anti-roll bar would not mistake the banked road as a transient turn to activate active anti-roll bar for handling roll control.

Yet another further benefit is increasing the response time over the sole braking-based roll stability controls to achieve timely activation.

As described above, the roll angle computation unit 112 detects the roll angle θ of the vehicle body with respect to the average road surface. This may also be referred to as a relative roll angle. The roll moment command unit 84 computes the roll moment $M_R$ to counteract the roll motion due to lateral tire force. The rollover detection system detects single wheel and two wheel lifting of the vehicle to identify the severity of the rollover of the vehicle. The output of the rollover detection unit is the wheel lift flags SWL output of box 114 for single wheel lifting and DWL for two wheel lifting output of box 116. The actuation priority unit 88 arbitrates and coordinates among front active anti-roll bar, rear active anti-roll bar and brake actuators. This arbitration is in both sequential mode and in simultaneous mode.

Using the detected roll angle θ, the roll feedback control computation unit 118 compute the desired counteracting roll moment $M_R$ as in the following. If the sequential difference of the relative roll angle θ is defined as:

$$\Delta\theta(k) = \theta(k) - \theta(k-1)$$

at time instant k, then the feedback roll moment $M_R$ can be calculated as the following $$M_R(k) = M_R(k-1) + K_p(k)\Delta\theta(k) + K_I(k)\theta(k) + \\ K_D(k)[\Delta\theta(k) - \Delta\theta(k-1)] + K_{DD}(k)[\Delta\theta(k) - 2\Delta\theta(k-1) + \Delta\theta(k-2)]$$

where $K_p$, $K_I$, $K_D$ and $K_{DD}$ are the adaptive proportional, integral, derivative and double derivative control gains. They might be based on the magnitude of the lateral acceleration signal and the roll acceleration, the rate change of steering angle, the yaw rate sensor signal, the roll rate sensor signals.

The priority logic units 86, 88 figure out when and how much command should be sent to the involved actuators. The independently controlled front and rear active anti-roll bars 70, 72 can be achieved by sending voltage PWM duty cycles to the corresponding active anti-roll bar actuators. The roll stiffness due to front duty cycle command $DC_f$ can be computed as the following:

$$K_{ARBf} = \epsilon_f \overline{K}_{ARBf} DC_f$$

where $\overline{K}_{ARBf}$ is the maximum roll stiffness for the front active anti-roll bar when it is fully activated, $\epsilon_f$ is a gain for the front active anti-roll bar.

The similar relationship holds for the rear active anti-roll bar with the rear duty cycle command $DC_r$.

$$K_{ARBr} = \epsilon_r \overline{K}_{ARBr} DC_r$$

with $K_{ARBr}$ the maximum roll stiffness for the rear active anti-roll bar when it is fully activated, $\epsilon_r$ is a gain for the rear active anti-roll bar.

If both front and rear active anti-roll bars are actuated simultaneously, the achieved roll stiffness is a linear combination of $K_{ARBf}$ and $K_{ARBr}$. Let $M_{ARB}$ be the roll moment generated through activating the front and rear active anti-roll bar, then it can be related to active anti-roll bar PWM duty cycles as in the following $$M_{ARB} = (\epsilon_f \overline{K}_{ARBf} DC_f + \epsilon_r \overline{K}_{ARBr} DC_r)\theta$$

Let $M_{BRK}$ be the roll moment generated through brake control at current driving condition, then it can be related to the brake pressure through adaptive gain gains by the formula:

$$M_{BRK}(k) = G_f(k)p_f(k) + G_r(k)p_r(k)$$

where $p_f$ indicates the braking pressure at one of the front wheels, and $p_r$ the braking pressure at one of the rear wheels. The gain $G_f$ changes during driving. $G_f$ may depend on: the axle normal force N, the surface friction coefficient $\mu_{surface}$ the front and rear steering angle $\delta_f$ and $\delta_r$, the total brake piston area $A_{piston}$, the friction coefficient between the disk and the brake lining $\mu_{disk\text{-}lining}$, the rolling radius of the wheel r, the average distance to the brake pad, the wheel rotation center l, the height of center of gravity of the vehicle $h_{cg}$.

A mathematical formula for $G_f$ may also be determined. For example $G_f$ might be expressed as $$G_f(k) = \frac{2h_{cg}C_{pf}(k)}{\sqrt{[N(k)\mu_{surface}(k)]^2 - (C_{pf}(k)p_{f0}(k))^2}}$$

where $C_{pf}(k)$ is the coefficient used to relate the lateral tire forces of the front wheels to the front wheel brake pressure $p_f(k)$ at time instant k, which is a function of the above listed variables, $p_{f0}(k)$ is the nominal brake pressure or the pressure at the time the rollover brake control is requested, which can be estimated from a brake system model or measured through a pressure sensor. Similarly, a similar relationship for rear wheels may also be obtained.

Using the aforementioned relationship between actuation commands and the achievable roll moments, the actuation coordination and arbitration can be performed. The following discussion shows what is inside the priority units 86, 88.

Figure 7:
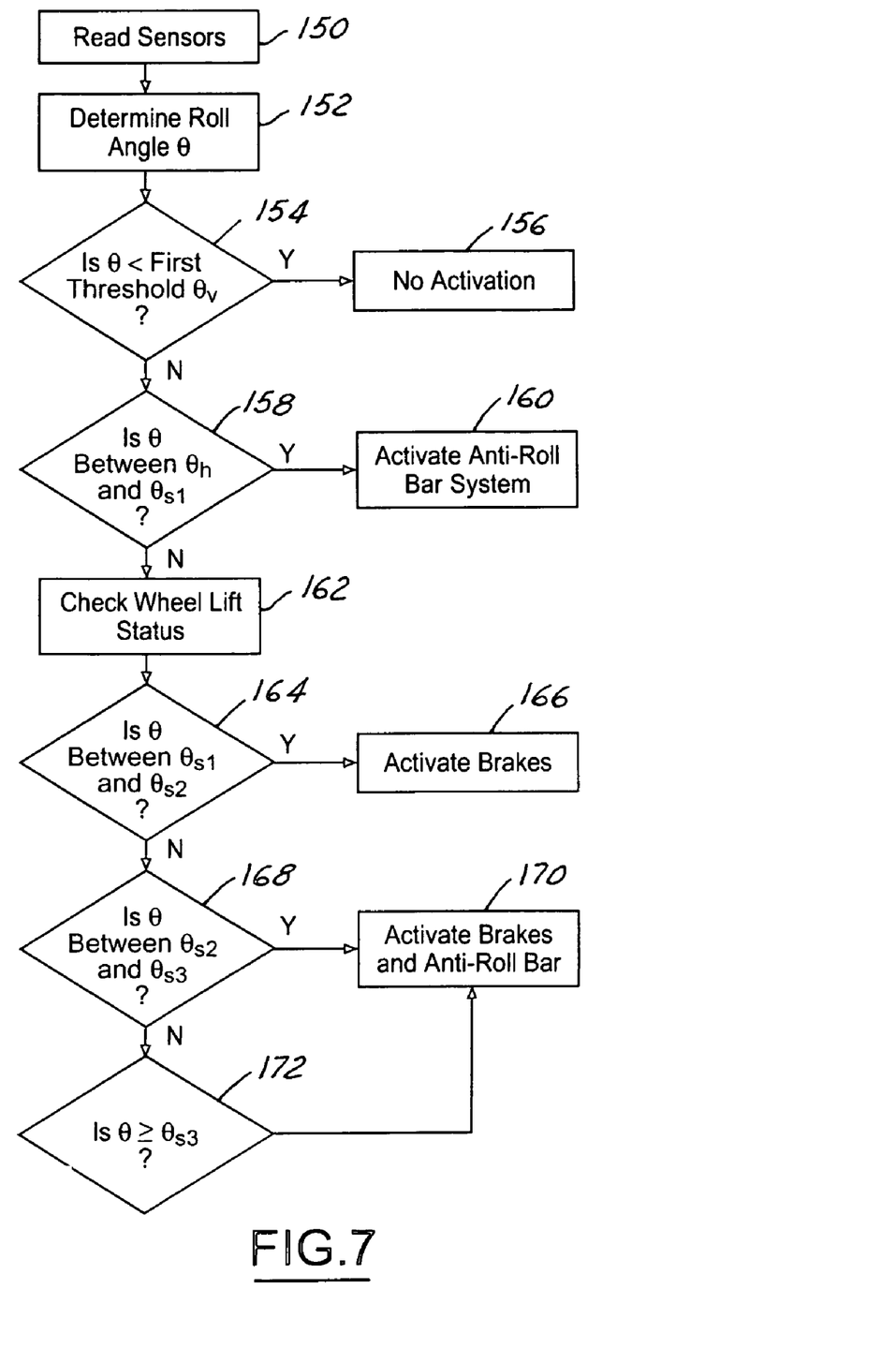
FIG. 7 is a flow chart illustrating one operational embodiment of the invention.

Referring now to FIG. 7, one method for activating the system is illustrated. In step 150 the various sensors are read to determine the rolling moment and roll angle. In step 152 the roll angle is determined. The following describes the different priority levels of the system.

Priority #1: No activation. If the detected vehicle roll angle $\theta$ does not exceed a small vibration threshold $\theta_v$ in step 154, both active anti-roll bar system and braking system are not activated in step 156. Logic for this may be:

if $|\theta| \leq \theta_v$
$DC_f=0$, $DC_r=0$, $p_f=0$, $p_r=0$
end where $\theta_v$ is the maximum roll angle threshold for vibration roll.

Priority #2: Active anti-roll bar priority logic for handling roll activation. If the detected roll angle shows the vehicle is in the handling roll between $\theta_h$ and $\theta_{s1}$ in step 158, the active anti-roll bar system is activated to conduct tilt control. Let $M_R$ be the rolling moment desired for controlling handling roll, then the following shows how to calculate the duty cycle for the front or the rear active anti-roll bar or for both front and rear active anti-roll bar together.

if $\theta_h \leq |\theta| \leq \theta_{s1}$ if $M_R\theta \leq 0$

∘ $DC_f = 0$, $DC_r = 0$ else if $0 < M_R\theta \leq \varepsilon_r \overline{K}_{ARBr}\theta^2$ ∘ $DC_f = 0$, $DC_r = \dfrac{M_R}{\varepsilon_r \overline{K}_{ARBf}\theta}$ else if $\varepsilon_r \overline{K}_{ARBr}\theta^2 \leq M_R\theta \leq \varepsilon_f \overline{K}_{ARBf}\theta^2$ ∘ $DC_f = \dfrac{M_R}{\varepsilon_r \overline{K}_{ARBf}\theta}$, $DC_f = 0$ else if $\varepsilon_j \overline{K}_{ARBf}\theta^2 \leq M_R\theta \leq \varepsilon_f \overline{K}_{ARBf}\theta^2 + \varepsilon_r \overline{K}_{ARBr}\theta^2$ -continued ∘ $DC_f = \dfrac{\varepsilon_f \overline{K}_{ARBf} M_R}{\theta\sqrt{(\varepsilon_f \overline{K}_{ARBf})^2 + (\varepsilon_r \overline{K}_{ARBr})^2}}$ $DC_r = \dfrac{\varepsilon_r \overline{K}_{ARBf} M_R}{\theta\sqrt{(\varepsilon_f \overline{K}_{ARBf})^2 + (\varepsilon_r \overline{K}_{ARBr})^2}}$ end where $\theta_h$ is the minimum roll angle where handling roll control is expected, and $\theta_{s1}$ is the minimum roll angle where the roll over prevention control is expected.

Priority #3: Brake priority logic for mild safety roll control. In this stage, the outputs SWL and DWL flags from the rollover detection unit are checked in step 162. If they are indicating single wheel lifting and/or two lifting, which represents the determination of a roll condition or likelihood of rollover, a little bit more aggressive rolling moment than handling roll control will be generated by commanding braking controls. In step 164 the roll angle $\theta$ is compared to thresholds $\theta_{s1}$ and $\theta_{s2}$. Logic for this may be:

if $\theta_{s1} \leq |\theta| \leq \theta_{s2}$ and (SWL = 1 or DWL = 1)

if $|M_R| < G_r \Delta p_{max}$

∘ $\Delta p_f = 0$, $\Delta p_r = \dfrac{|M_R|}{G_r}$ else if $G_r \Delta p_{max} \leq |M_R| < G_f \Delta p_{max}$ ∘ $\Delta p_f = \dfrac{|M_R|}{G_r}$, $\Delta p_r = 0$ else if $G_r \Delta p_{max} \leq |M_R| \leq \overline{M}_{BRK}$ ∘ $\Delta p_f = \dfrac{G_f |M_R|}{\sqrt{G_f^2 + G_r^2}}$, $\Delta p_r = \dfrac{G_r |M_R|}{\sqrt{G_f^2 + G_r^2}}$ end where $\theta_{s2}$ is the maximum roll angles where brake-alone roll control is effective. The threshold value may be obtained experimentally on the test track. In step 166 the brakes are activated.

Priority #4: Coordinated priority logic for medium safety roll control. In this case, the active anti-roll bar-alone and brake-alone might not generate enough roll moment to counteract roll moment due to lateral tire forces. A combined control of them is needed. In step 168 if the roll angle $\theta$ is determined to be between $\theta_{s2}$ and $\theta_{s3}$ then the brakes and anti-roll bar are activated in step 170.

if ($\theta_{s2} \leq |\theta| \leq \theta_{s3}$ and (SWL = 1 or DWL = 1))

if $|M_{BRK}| \leq \overline{M}_{ARB}$

∘ Go to priority 3.

else if $\overline{M}_{BRK} \leq |M_R| \leq \overline{M}_{ARB} + \overline{M}_{BRK}$ ∘ $DC_f = \dfrac{\varepsilon_f \overline{K}_{ARBf} M_R}{\sqrt{(\varepsilon_f \overline{K}_{ARBf}\theta)^2 + (\varepsilon_r \overline{K}_{ARBr}\theta)^2 + G_f^2 + G_r^2}}$ -continued $$DC_r = \frac{\varepsilon_r \overline{K}_{ARBr} M_R}{\sqrt{(\varepsilon_f \overline{K}_{ARBf} \theta)^2 + (\varepsilon_r \overline{K}_{ARBr} \theta)^2 + G_f^2 + G_r^2}}$$

$$\Delta p_f = \frac{G_f M_R}{\sqrt{(\varepsilon_f \overline{K}_{ARBf} \theta)^2 + (\varepsilon_r \overline{K}_{ARBr} \theta)^2 + G_f^2 + G_r^2}}$$

$$\Delta p_r = \frac{G_r M_R}{\sqrt{(\varepsilon_f \overline{K}_{ARBf} \theta)^2 + (\varepsilon_r \overline{K}_{ARBr} \theta)^2 + G_f^2 + G_r^2}}$$

end

Priority #5: Simultaneous priority logic for maximum safety roll control. If the roll angle exceeds the threshold $\theta_{s3}$, then step 170 may again be executed to provide maximum control.

If ($|\theta| \geq \theta_{s3}$ and DWL=1)
   if $|M_R| \leq \overline{M}_{ARB} + \overline{M}_{BRK}$
     Go to priority 4
   If $|M_R| > \overline{M}_{ARB} + \overline{M}_{BRK}$
     $DC_f$=100%, $DC_r$=100%, $\Delta p_f = \Delta p_{max}$, $\Delta p_r = \Delta p_{max}$
   end In summary the actuation priority unit compares the moment to prevent rollover with the roll moments being provided at the front brake system, the rear brake system, the front active anti-roll bar system and the rear active anti-roll bar system, and determining the brake pressure signals for the front and the rear brake systems and a front active anti-roll bar signal and rear active anti-roll bar signal in response to the priority. Front or rear anti-roll bar control may be implemented. Controlling both may also be performed. Based on the four regions of the roll angle, namely, the vibration roll, handling roll, safety roll and uncontrollable region, together with the desired roll moment (feedback moment $M_R$) and the wheel lifting information, five priority schedules may be conducted.

It should also be noted that the anti-roll bars may be allowed to control yawing of the vehicle while the braking is used for rollover control or vice-versa. For example, during an aggressive maneuver both the brakes and anti-roll bar may be used until a certain reduced level of roll potential is achieved as indicated by the rollover sensing system. Then, one of the devices may be shifted to yaw control (simultaneously used with the other device to control roll). The system may also not only allow use of rollover and yaw together, but also rollover and traction control or anti-lock brakes.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A roll stability control system for an automotive vehicle comprising:
    an active anti-roll bar system;
    a rollover sensing system generating a roll attitude signal indicative of an impending rollover of the vehicle; and
    a controller coupled to the active anti-roll bar system and the rollover sensing system, said controller controlling the active anti-roll bar to prevent the vehicle from rolling over in response to the roll attitude signal.

2. A roll stability control system as recited in claim 1 further comprising a brake actuator coupled to the controller, said controller controlling the active anti-roll bar system and the brake actuator to prevent the vehicle from rolling over.

3. A roll stability control system as recited in claim 1 wherein the active anti-roll bar system comprises a front active anti-roll bar.

4. A roll stability control system as recited in claim 1 wherein the active anti-roll bar system comprises a rear active anti-roll bar.

5. A roll stability control system as recited in claim 1 wherein the active anti-roll bar system comprises a front active anti-roll bar and a rear anti-roll bar.

6. A roll stability control system as recited in claim 1 wherein said rollover sensing system comprises a speed sensor, a lateral acceleration sensor, a roll rate sensor, and a yaw rate sensor.

7. A stability control system as recited in claim 1 wherein said controller changes a tire force vector by coordinately changing a roll angle through said active anti-roll bar system, and changing the front brake pressure and the rear brake pressure.

8. A method of operating a roll stability control system for an automotive vehicle having an active anti-roll bar comprising:
    determining a roll attitude signal indicative of an impending rollover of the vehicle; and
    controlling the active anti-roll bar system to prevent the vehicle from rolling over in response to the roll attitude signal.

9. A method as recited in claim 8 wherein controlling comprises controlling the active anti-roll bar and a brake system to prevent the vehicle from rolling over in response to the roll attitude signal.

10. A method as recited in claim 8 wherein controlling comprises controlling a front or rear anti-roll bar.

11. A method as recited in claim 8 wherein controlling comprises controlling a front and rear anti-roll bar.

12. A method of operating a roll stability control system for an automotive vehicle having an active anti-roll bar and a brake system comprising:
    determining a roll attitude signal indicative of an impending rollover of the vehicle;
    when the roll attitude is between a first and second threshold, controlling the active anti-roll bar system to reduce a rolling moment of the vehicle; and
    when the roll attitude is above a second threshold, controlling the active anti-roll bar system and the brake system to reduce a rolling moment of the vehicle.

13. A method as recited in claim 12 further comprising determining a wheel lifted condition indicative of a lifted wheel, wherein when the roll attitude is between a first and second threshold, controlling the active anti-roll bar system to reduce a rolling moment of the vehicle comprises when the roll attitude is between a first and second threshold and a wheel lifted condition exists, controlling the active anti-roll bar system to reduce a rolling moment of the vehicle.

14. A method as recited in claim 12 further comprising when the roll attitude is between said second threshold and a third threshold, said third threshold being less than the second threshold, controlling a brake system alone to reduce a rolling moment of the vehicle.

15. A method of controlling roll stability of an automotive vehicle having a front and rear brake system, and a front and rear active anti-roll bar system comprising the steps of:
    determining a roll angle estimate in response to roll sensing system sensors;

controlling a front and rear active anti-roll bar in response to the roll angle estimate; and controlling a front and rear brake controller in response to the relative roll angle estimate to provide a predetermined tire force vector.

16. A method as recited in claim 15 wherein determining a roll angle estimate comprises:

determining a yaw rate for the vehicle;

determining a roll rate for the vehicle;

determining a lateral acceleration for the vehicle;

determining vehicle speed.

17. A method as recited in claim 15 wherein the step of controlling comprises the steps of determining a roll moment distribution from a brake system and from an active anti-roll bar system.

18. A method as recited in claim 15 wherein the automotive vehicle comprises an antilock brake system generating an antilock brake signal and a traction control system generating a traction control signal, and further comprising the steps of generating a brake actuator signal in response to said rollover signal, said antilock brake signal, and said traction control signal, and generating a front and rear active anti-roll bar control signal in response to said rollover signal, said front and rear active anti-roll bar control signal controlling said front and rear active anti-roll bar actuators and said brake actuator signal controlling said brake actuator to prevent the vehicle from rolling over.

19. An automotive vehicle comprising:

an antilock brake controller generating an antilock brake signal;

a traction controller generating a traction control brake signal;

an active anti-roll bar system having a front active anti-roll bar actuator and a rear active anti-roll bar actuator;

a front brake actuator;

a rear brake actuator;

a roll attitude sensing system for producing a rollover signal in response to an impending rollover of the vehicle; and a rollover controller coupled to said rollover sensor, said active anti-roll bar system, and said front brake actuator and rear brake actuator, said rollover controller having brake pressure priority logic generating a brake actuator signal in response to said rollover signal, said antilock brake signal, and said traction control brake signal, said controller generating a front and/or rear active anti-roll bar actuator signals in response to said rollover signal, said active anti-roll bar actuator signals controlling said front and/or rear active anti-roll bar actuators and said brake actuator signal controlling said brake actuator to prevent the vehicle from rolling over.

20. An automotive vehicle as recited in claim 19 wherein roll stability control is conducted by sequentially controlling the active anti-roll bar actuators and brake actuators.

21. An automotive vehicle as recited in claim 19 wherein said roll stability controller is conducted by simultaneously controlling the active anti-roll bar actuators and brake actuators so as to achieve a maximum tire lateral force reduction during severe rollovers.

* * * * *